United States Patent [19]

Thebault et al.

[11] Patent Number: 5,622,751
[45] Date of Patent: Apr. 22, 1997

[54] METHOD OF PROTECTING PRODUCTS OF COMPOSITE MATERIAL AGAINST OXIDIZING AND PRODUCTS PROTECTED THEREBY

[75] Inventors: Jacques Thebault, Bordeaux; Marc Lacoste, Villenave D'Ornon; Alain Nale, Saint Romain La Virvee, all of France

[73] Assignee: Societe Europeenne de Propulsion, Suresnes, France

[21] Appl. No.: 583,767

[22] Filed: Jan. 8, 1996

Related U.S. Application Data

[63] Continuation of Ser. No. 343,361, Nov. 22, 1994, abandoned, which is a continuation of Ser. No. 997,887, Dec. 29, 1992, abandoned.

[30] Foreign Application Priority Data

Dec. 30, 1991 [FR] France ................. 91 16320

[51] Int. Cl.$^6$ ............................................. B05D 3/02
[52] U.S. Cl. ..................... 427/376.2; 427/397.7; 427/419.2; 427/421; 427/443.2
[58] Field of Search ..................... 427/376.2, 397.7, 427/419.2, 421, 443.2

[56] References Cited

U.S. PATENT DOCUMENTS

| | | | |
|---|---|---|---|
| 2,972,556 | 2/1961 | Vrahiotes | 427/249 |
| 3,807,996 | 4/1974 | Saro | 427/249 |
| 4,397,901 | 8/1983 | Warren | 427/249 |
| 4,952,658 | 8/1990 | Kalchauer et al. | 528/34 |

FOREIGN PATENT DOCUMENTS

| | | |
|---|---|---|
| 0336404 | 4/1989 | European Pat. Off. . |
| 0420187 | 9/1990 | European Pat. Off. . |
| 967846 | 12/1957 | Germany . |
| 812740 | 4/1959 | United Kingdom . |

*Primary Examiner*—Benjamin Utech
*Attorney, Agent, or Firm*—Weingarten, Schurgin, Gagnebin & Hayes LLP

[57] ABSTRACT

The method comprises forming a coating on the product of composite material to be protected. The coating contains a mixture of a non-oxide refractory ceramic in finely-divided form, at least one refractory oxide in finely-divided form and providing healing properties by forming a glass, and a binder constituted by a polymer that is a precursor of a non-oxide refractory ceramic. The polymer is transformed into a ceramic to obtain a protective layer comprising a non-oxide refractory ceramic phase and a healing phase which together constitute two interpenetrating lattices. After the ceramic precursor polymer has been transformed, a final heat treatment step may be performed at a temperature higher than the softening or melting temperature of the healing phase.

15 Claims, 1 Drawing Sheet

Al₂O₃–SiO₂ LATTICE    SIC LATTICE

CARBIDE SURFACE

METHOD OF PROTECTING PRODUCTS OF COMPOSITE MATERIAL AGAINST OXIDIZING AND PRODUCTS PROTECTED THEREBY

This application is a continuation of application Ser. No. 08/343,361, filed Nov. 22, 1994, now abandoned, which is a continuation of application Ser. No. 07/997,887 filed on Dec. 29, 1992, now abandoned.

The present invention relates to protecting composite material products from oxidizing.

BACKGROUND OF THE INVENTION

The field of the invention is more particularly that of refractory composite materials for use at relatively high temperatures. Such composite materials are constituted by fiber-reinforcement of refractory material densified by a matrix that is likewise refractory and that fills, at least in part, the pores initially present in the fiber reinforcement. The materials from which the fiber reinforcement and the matrix are made are typically selected from carbon and ceramics.

For composite material products containing carbon, it is essential to provide protection against oxidizing in order to avoid the products deteriorating rapidly by the carbon oxidizing whenever the products are used in an oxidizing atmosphere at a temperature exceeding 350° C. Unfortunately refractory composite materials very frequently contain carbon, in particular as a constituent of the fibers forming the fiber reinforcement, or as a constituent of at least a portion of the matrix. A thin layer of carbon may also be formed on the fibers of fiber reinforcement in order to constitute an interphase for providing adequate bonding between the fiber reinforcement and the matrix.

A barrier against ambient oxygen is generally formed by interposing a continuous layer of an oxygen-withstanding ceramic between the carbon contained in the product and the outside surface thereof. This is done either by making at least the outermost portion of the matrix out of such a ceramic, or else by forming an outer coating constituted by said ceramic on the composite material product. The ceramic used is typically a refractory carbide, in particular silicon carbide (SiC). Other carbides are suitable, such as zirconium carbide (ZrC) or hafnium carbide (HfC).

Regardless of whether it constitutes the matrix or merely forms an outer coating on the product, such a layer of refractory carbide is inevitably the seat of microcracking. Microcracks inevitably appear during use of the product due to the mechanical stresses that are applied thereto and to the differences between the thermal expansion coefficients of the constituent materials of the composite. Similar faults may even appear while the product is being made.

Because of the almost inevitable residual porosity of the composite material (in practice the pores initially present in fiber reinforcements are never completely filled by the matrix), the phenomenon of microcracking takes place not only on the surface, but also in the core of the product. Such cracks thus give ambient oxygen access to the underlying carbon.

A known way of solving this problem consists in adding a protective layer that has healing properties for plugging, filling, or sealing the cracks. While the product is in use, varying mechanical and thermal stresses give rise to changes in the shapes of the cracks, in particular the lips of the cracks move together or apart. It is therefore necessary for the healing protective layer to be capable of following such movements without itself cracking. That is why this protective layer is usually made up of elements that constitute a glass or that are suitable for constituting a glass after they have oxidized, with the glass being selected to have viscous behavior at the temperature at which the product is used.

The vitreous healing protective layer nevertheless offers less resistance to abrasion than would a layer of carbide, and while in the viscous state, it also runs the risk of being blown off. Unfortunately, in certain applications, for example parts of aircraft engines or coatings for space aircraft, the surfaces of composite material parts are subjected, in use, to flows of gas at very high speed or they are highly centrifuged, thereby obtaining such a blowing-off effect.

Proposals have therefore been made to provide the healing protective layer with an outer protective coating that withstands abrasion and blowing-off, e.g. an outer coating of a refractory carbide such as SiC. Such an outer coating can be provided, for example, by chemical vapor deposition or infiltration. The composite material product is then protected by a plurality of layers comprising a healing layer that has viscous properties and that lies between two layers of refractory carbide.

An object of the present invention is to provide a method making it possible to protect a carbon-containing composite material against oxidizing, which protection is to be effective over a relatively large temperature range, of about 350° C. to about 1700° C.

Another object of the invention is to provide a method which is easy to implement while nevertheless providing a protective layer presenting both healing properties and high resistance to abrasion and to being blown off.

SUMMARY OF THE INVENTION

According to the invention, this object is achieved by a method comprising the following steps:

forming a coating on the product of composite material to be protected, said coating containing a mixture of a non-oxide refractory ceramic in finely-divided form, at least one refractory oxide in finely-divided form and providing healing properties by forming a glass, and a binder constituted by a polymer that is a precursor to a non-oxide refractory ceramic; and transforming the polymer into ceramic so as to obtain a protective layer comprising a non-oxide refractory ceramic phase and a healing phase together constituting two inter-penetrating lattices or networks.

The term "healing phase" is used herein to designate a phase capable of plugging cracks by taking on a viscous state at the temperature of use of the protected product, whereas the term "refractory ceramic phase" is used herein to designate a ceramic such as a carbide, a nitride, a silicide, or a boride that has a melting or softening temperature that is greater than the utilization temperature of the product, and preferably greater than 1700° C.

The method of the invention is thus remarkable in that it makes it possible to satisfy the contradictory requirements of "hard" refractory protection that withstands abrasion, blowing-off, and centrifuging, and of self-healing protection that is thus "soft".

Another advantage of the method of the invention lies in that the coating is very easy to form. A solvent of the precursor can be added to the mixture constituted by the refractory ceramic and the finely-divided oxides(s) together with the ceramic precursor polymer, thereby obtaining a liquid suspension. Coating is then performed by soaking the product in a bath of said liquid suspension, or by spraying, or by brushing, after which the product is dried to eliminate the solvent.

The refractory ceramic fillers, constituting a part of the refractory phase, and the fillers of oxide(s) constituting the healing phase are in the finely-divided state. They may be constituted, for example, by powders of small grain size (less than 50 microns) and/or "whiskers" or short fibers.

The refractory ceramic is selected from refractory carbides such as SiC, ZrC, HfC, refractory silicides such as molybdenum silicide $MoSi_2$, nitrides, and borides having a melting or decomposition temperature which is preferably greater than 1700° C.

The refractory oxide(s) constituting the healing phase are selected, in particular, from silica $SiO_2$, and alumina $Al_2O_3$. Other oxides may be added to adjust the temperature range in which the glass has viscous behavior suitable for healing purposes: and in particular barium hydroxide $Ba(OH)_2$ may be added which generates barium oxide (BaO), or else calcium oxide (CaO) may be added, . . . .

Preferably, in the coating constituted by the fillers of ceramic and of oxide(s) and by the ceramic precursor polymer, the ceramic fillers represent 35% to 85% by volume, the fillers of oxide(s) constituting the healing phase comprise 10% to 65% by volume, and the ceramic from the polymer comprises 3% to 55% by volume.

Because of its cross-linking prior to its transformation into a ceramic, the ceramic precursor polymer makes it possible to establish a three-dimensional lattice that imprisons the fillers of refractory ceramic and of the oxide(s) forming the healing phase. It is possible to use any polymer that is a precursor of a refractory ceramic, and in particular a polymer used in the manufacture of refractory ceramic fibers. For example, it is possible to use polycarbosilane (PCS) which is a precursor of SiC, polytitanocarbosilane (PTCS) which is a precursor of SiC, or other precursors that are used to obtain ceramic fibers or films in the Si—C—O or the Si—C—N systems, such as silicones or polysilazanes.

After the precursor polymer has been transformed into ceramic, formation of the protective layer can be continued by heat treatment performed at a temperature higher than the melting or softening temperature of the healing phase. This final heat treatment enables the fillers constituting the healing phase to melt and to bond together. This gives rise to a continuous phase being formed (vitrification effect) that is interpenetrated with the refractory ceramic phase.

In a preferred implementation of the invention, the final heat treatment is performed in an oxidizing atmosphere, e.g. in air. This has the effect of enhancing the establishment of continuity in the healing phase. Another effect of the final heat treatment under an oxidizing atmosphere is to avoid a premature destruction of the refractory ceramic phase which may occur when oxygen partial pressure is too low, by a reaction of the active oxidation type. Such active oxidation gives rise to volatile species, and may occur, in particular between SiC (a constituent of the refractory carbide) and $SiO_2$ (a component of the healing phase) by the following reaction:

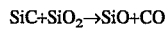

In order to avoid oxidizing the underlying composite material, the duration of the final vitrification heat treatment is selected to be relatively short, preferably less than one hour, and the product is raised directly to the appropriate temperature.

It may be observed that the protected product can be used without previously subjecting it to the final heat treatment.

Under such circumstances, the healing phase vitrifies when the product is exposed, in use, to the temperature required for such vitrification.

The protective layer obtained by the method of the present invention may form a portion of a more complex protection system of the multilayer type, thereby extending its field of effectiveness over a greater temperature range.

Thus, the protective layer of the present invention may be coated with an outer protective layer that is more effective in the lower portion of a temperature range going from 350° C. to 1700° C.

The protective layer of the present invention may also be formed on an inner protective layer that is more effective at very high temperatures, in particular a layer that is effective against active oxidation of SiC at temperatures greater than 1700° C. and at atmospheric pressure.

Naturally, the protective layer of the invention may be combined both with an inner protective layer that is effective at higher temperatures and an outer protective layer that is effective at less high temperatures so as to extend the range for which the protection against oxidizing is effective.

BRIEF DESCRIPTION OF THE DRAWING

Implementations of the invention is described by way of example with reference to the accompanying drawing, in which.

DETAILED DESCRIPTION

Figure 1:
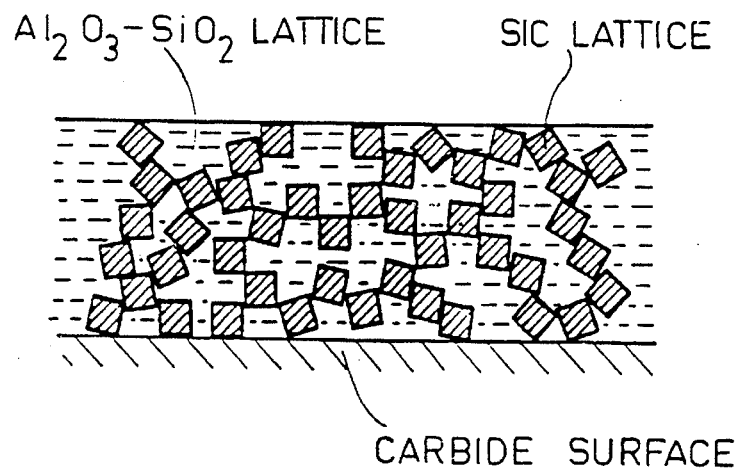
FIG. 1 is a highly diagrammatic fragmentary section through a protective layer obtained by a method of the invention.

In the following examples, the product to be protected is made of a C/SiC type composite material, i.e. it is made of carbon fiber reinforcement densified by a matrix of silicon carbide. In these examples, the fiber reinforcement is made up of superposed plies of carbon cloth and the SiC matrix is made by chemical vapor infiltration.

Naturally, the invention is applicable to composite materials in which the fiber reinforcement is made up from different fabrics, which may be unidirectional (threads, cables) or two-dimensional (sheets of felt, tape, cloth). When using two-directional fabrics, they may be superposed as flat plies or they may be draped in the shape desired for the product, or they may be rolled up, with superposed layers optionally being bonded together by needling or by implanting threads so as to form three-dimensional (3D) reinforcement. In addition, the fiber reinforcement may be made of a material other than carbon, in particular it may be made of silicon carbide or of a refractory oxide (e.g. zirconia). The fibers are then coated with a thin layer of pyrolitic carbon for forming an interphase to provide matching between the fiber reinforcement and the matrix.

Furthermore, the SiC matrix may be obtained not only by using a gas, but also by impregnating the fiber reinforcement with a precursor of SiC, such impregnation then being followed by transforming the precursor into SiC.

It may also be observed that application of the method is not limited to SiC matrix composite materials, but extends more generally to composite materials containing carbon, in particular carbon/carbon (C/C) composite materials, and, usually, a refractory constituent (such as SiC, ZrC, HfC), a nitride, a boride, or a silicide, such refractory constituents generally being present at least on the surface of the material, either as a constituent of the matrix in that portion thereof which is furthest from the fibers, or else as a constituent of an outer coating.

EXAMPLE 1

A sample of C/SiC composite material product was provided with protection against oxidizing as follows.

Polycarbosilane (PCS), a precursor of SiC, was dissolved in xylene at a concentration of 50% by weight PCS and 50% by weight xylene. Nine parts by weight (pbw) of SiC powder having a gain size of less than 325 Mesh (i.e. less than about 47 microns) and 3 pbw of silica-alumina powder ($SiO_2$—$Al_2O_3$) having a melting temperature of about 1400° C. were added to 10 pbw of said solution.

The viscosity of the mixture was adjusted by adding xylene so as to obtain a consistency suitable for the means used for depositing the solution on the sample of C/SiC (using a brush, spraying, soaking, . . . ). For example, for application by brush, 10 pbw of xylene were added.

A first layer was applied to the surface of the C/SiC sample and then dried by evaporating the xylene in a ventilated oven at 120° C. The layer was then raised to 350° C. in air for 1 hour to cross-link the PCS. After cross-linking, PCS is insoluble in xylene and a second layer could then be applied without redissolving the first. The second layer was dried and cross-linked like the first.

The sample coated in this way was raised to 900° C. with temperature being raised by about 300° C. per hour in an oven under an inert atmosphere, e.g. argon. At the end of that heat treatment, the cross-linked PCS was transformed into SiC.

The sample was then subjected to a vitrification cycle by being inserted directly into an oven at 1550° C. under air. The sample used reached this temperature after about 4 minutes. It was maintained at 1550° C. for about 15 minutes and was then taken straight out of the oven to return to ambient temperature.

The method described above provides a sample of C/SiC material in which the surface of the matrix is coated with a continuous protective layer of vitrified appearance that contains particles of SiC, and the lattice or network of SiC due to the transformation of the cross-linked PCS (see FIG. 1). The effectiveness of the protection against oxidation was tested by measuring the loss of mass of the sample after spending 9 hours at 1000° C. in an oven under an oxidizing atmosphere (air), with mass being lost by the carbon constituting the fiber reinforcement being oxidized.

Another sample of the same C/SiC material provided with a protective layer by the same method as that described above was tested under conditions that were identical except that the temperature was 1500° C. instead of 1000° C.

By way of comparison, the same tests were performed at 1000° C. and at 1500° C. on two samples of the same C/SiC material that had not been covered with a layer providing protection against oxidizing.

Table I below gives the measured values of mass loss dm/m for the various samples tested:

TABLE I

| Protection against oxidation | Temperature °C. Duration (h) | Relative mass loss |
| --- | --- | --- |
| yes | 1000° C. 9 h | 4% |

TABLE I-continued

| Protection against oxidation | Temperature °C. Duration (h) | Relative mass loss |
| --- | --- | --- |
| yes | 1500° C. 9 h | 0.8% |
| no | 1000° C. 9 h | 39.3% |
| no | 1500° C. 9 h | 17.4% |

Table I shows the effectiveness of the protection formed on the samples. It may also be observed that this effectiveness is better at 1500° C. (where mass loss is divided by about 22) than at 1000° C. (where mass loss is divided by about 9.8).

EXAMPLE 2

The same procedure was applied as in Example 1, but the solution of PCS in xylene was replaced by a solution comprising 50% by weight of polytitanocarbosilane (PTCS) in xylene, said solution being sold by the Japanese firm UBE under the name "Tyranno Varnish".

The protective products were subjected to the same oxidizing tests at 1000° C. and 1500° C. as in Example 1. The relative mass losses observed after those tests were identical to those measured on the samples of Example 1.

A comparison of Examples 1 and 2 shows that the effectiveness of the protection obtained is not spoiled by replacing PCS with another polymer that is a precursor of a refractory ceramic. As already mentioned, in addition to PCS and PTCS, it is possible to envisage using other precursor polymers known for making ceramic films or fibers, in particular in the Si—C—O or Si—C—N systems, e.g. polysilazanes and silicones.

EXAMPLE 3

The procedure was the same as in Example 1, but 1.8 pbw of Ba(OH)$_2$ were added to the mixture applied to the surface of the C/SiC material. As a result, BaO from the Ba(OH)$_2$ was also present in the protective layer obtained after the lapping-vitrification heat treatment.

Samples protected in this way were subjected to the same oxidizing tests as in Example 1. At 1000° C. the measured relative mass loss was 2.3% and at 1500° C., it was 0.6%.

Compared with unprotected C/SiC material, the effectiveness ratio is about 17 at 1000° C. (instead of 9.8 in Example 1) and it was about 29 at 1500° C. (instead of 22 in Example 1). Consequently, the general effectiveness of the protection was not only increased, but it was also made more uniform over the range 1000° C. to 1500° C.

Figure 2:
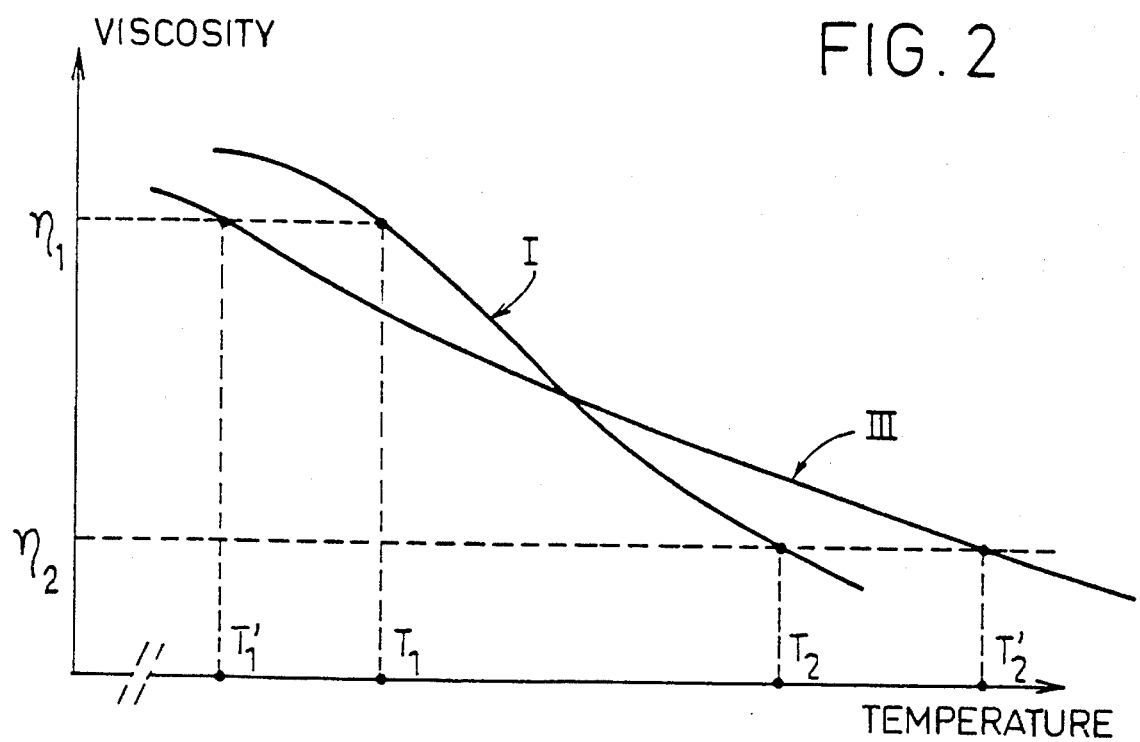
FIG. 2 shows how the viscosities of glasses having different compositions vary as a function of temperature.

This may be explained by the fact that the presence of BaO has the effect of "extending" the glass. In FIG. 2, curve I shows how the viscosity of a glass obtained from the silica-alumina of Example 1 varies as a function of temperature. The healing phase is effective when its viscosity comes below a limit value 1, above which the viscosity is too high to provide a genuine healing effect, and above a limit value 2, below which the vitreous phase is too fluid and flows away too easily. Consequently, the healing phase is effective at temperatures lying between the values T1 and T2 that correspond to 1 and 2.

Adding BaO to the silica-alumina of Example 1 gives rise to curve III in FIG. 2. It can be seen that the viscosity upper limit 1 is reached a temperature T1 that is lower than T1, while the viscosity upper limit 2 is achieved at a temperature T2 that is greater than T2. The range over which the healing phase is effective is thus enlarged (the glass has been "extended").

This effect of the glass being "extended" by adding BaO is known per se. It is also known that this effect can be obtained by adding a limited quantity of compounds other than BaO, in particular alkaline-earth compounds such as salts or oxides of barium, calcium, . . . (e.g. CaO).

EXAMPLE 4

The procedure was the same as in Example 1, but the silica-alumina powder having a melting point of 1400° C. was replaced by a silica-alumina powder having a melting point of 1250° C, and the final heat treatment temperature was limited to 1300° C.

Oxidation tests were performed as in Example 1. At 1000° C. the measured relative mass loss was 1.1% and at 1500° C., the measured relative mass loss was 3.2%.

Examples 3 and 4 show that the method of the invention can be implemented using different healing vitreous phases, with the basic composition of the silica-alumina fillers being determined as a function of the utilization temperature of the protective product, with additional fillers being added, where applicable, to adjust the temperature range over which effective protection is provided.

Silica-alumina powders having different melting points are well known products, that are commercially available, and that are used, in particular, in the manufacture of pyrometric cones.

EXAMPLE 5

The procedure was the same as in Example 1, but the 9 pbw of SiC powder were replaced by 16 pwb of molybdenum silicide powder ($MoSi_2$).

Protected samples of C/SiC material were subjected to the same oxidation tests as in Example 1. The measured relative mass loss values were identical to those observed on the materials protected as in Example 1.

The advantage of replacing SiC powder with $MoSi_2$ powder stems from the fact that $MoSi_2$ has higher emissivity than SiC. At 1100° C., an emissivity of $\epsilon=0.79$ is obtained with SiC, whereas with $MoSi_2$, $\epsilon=0.84$ is measured.

Depending on the intended application for the protected material, it is thus possible to modify the emissivity thereof by changing the nature of the refractory ceramic fillers.

EXAMPLE 6

The procedure was the same as for Example 1, but 50% by weight of the SiC powder was replaced by SiC whiskers.

Oxidation tests were performed as in Example 1. The measured mass loss shows that the effectiveness of the protection against oxidation was the same as in Example 1.

However, by including SiC whiskers instead of a fraction of the SiC powder, a protective layer against oxidation was obtained having improved resistance to scratching.

As already mentioned, the protective layer made in accordance with the present invention may be associated with an outer protective layer superposed thereon and/or with an inner protective layer underlying it in order to improve protection against oxidizing respectively at lower temperatures (bottom end of the 350° C. to 1700° C. range) and at higher temperatures (above 1700° C.).

This outer protective layer is constituted by a composition mainly containing a mixture of alumina and silica phosphates belonging to the $P_2O_5$—$SiO_2$—$Al_2O_3$ system which, after heat treatment, is transformed into an insoluble cement suitable for forming a self-healing glass. The outer protective layer may be formed by spraying or by brushing a liquid suspension containing the mixture of alumina and silica phosphates.

For a composite material product having a ceramic on its surface formed by a silicon compound, the inner protective layer may be as described in U.S. Pat. No. 5,332,619, for example.

The inner protective layer is formed by a silica-based vitreous coating with an intermediate coating of alumina or an alumina precursor being interposed between the ceramic surface and the coating. The intermediate coating constitutes a reaction barrier between the ceramic formed by the silicon compound and the silica of the vitreous coating. In addition, by forming mullite, the intermediate coating is suitable for trapping any silica that may be formed by oxidation of the silicon compound. This inner protective layer provides protection against oxidation both under conditions corresponding to the active oxidation range of the silicon compound and under conditions corresponding to its passive oxidation range. An interphase of mullite may be formed on one side and/or the other of the intermediate coating.

We claim:

1. A method of protecting a composite material product against oxidation by means of at least one refractory ceramic and a healing composition, wherein the method comprises the following steps:

forming a coating on the product of composite material to be protected, said coating comprising a mixture of a non-oxide refractory ceramic consisting of particles smaller than fifty microns, at least one refractory oxide consisting of particles smaller than fifty microns and providing healing properties by forming a glass, and a binder comprising a polymer that is a precursor to a non-oxide refractory ceramic;

cross-linking said polymer that is a precursor to a non-oxide ceramic; and transforming said polymer into ceramic so as to obtain a protective layer comprising a non-oxide refractory ceramic phase and a healing phase together having a structure comprising two completely commingled networks.

2. The method according to claim 1, wherein the coating is formed on the composite material product from a liquid suspension comprising said mixture to which a solvent is added for the polymer that is a precursor to a non-oxide ceramic.

3. The method according to claim 2, wherein the coating is formed by applying the liquid composition by means of a brush or by spraying, and then by eliminating the solvent.

4. The method according to claim 2, wherein the coating is formed by soaking in a bath of the liquid composition, and then by eliminating the solvent.

5. The method according to claim 1, wherein the steps of forming a coating on the composite material product and of cross-linking the polymer that is a precursor to a non-oxide ceramic are repeated at least once before the coating is transformed.

6. The method according to claim 1, further including a heat treatment step performed after the ceramic precursor polymer has been transformed and at a temperature higher than the melting or softening temperature of the healing phase.

7. The method according to claim 6, wherein the heat treatment is performed by raising the product directly to the temperature higher than the melting or softening temperature of the healing phase and by maintaining it at said temperature for a period of time sufficient to enable materials comprising the healing phase to melt and bond together, in an oxidizing atmosphere.

8. The method according to claim 1, wherein the refractory ceramic comprises refractory silicides, borides, nitrides, or carbides.

9. The method according to claim 1, wherein the refractory oxide is selected from the silica-alumina system.

10. The method according to claim 9, wherein the mixture constituting the coating further includes at least one additional oxide comprising barium oxide or calcium oxide.

11. The method according to claim 1, wherein the ceramic precursor polymer comprises polycarbosilane, polytitanocarbosilane, polysilazanes, or silicones.

12. The method according to 1, wherein said transforming step comprises heating the coating to a temperature sufficient to transform the polymer that is a precursor to a non-oxide ceramic into a ceramic.

13. A method of protecting a composite material product against oxidation by means of at least one refractory ceramic and a healing composition, comprising the following steps:

forming a coating on the product of composite material to be protected, said coating comprising a mixture of a non-oxide refractory ceramic consisting of particles smaller than fifty microns, at least one refractory oxide consisting of particles smaller than fifty microns and providing healing properties by forming a glass, and a binder comprising a polymer that is a precursor to a non-oxide refractory ceramic;

cross-linking said polymer that is a precursor to a non-oxide ceramic;

transforming said polymer into ceramic so as to obtain a first protective layer comprising a non-oxide refractory ceramic phase and a healing phase together having a structure comprising two completely commingled networks; and forming a second protective layer, on said first protective layer, of a composition comprising a mixture of alumina and silica phosphates.

14. A method of protecting a composite material product against oxidation by means of at least one refractory ceramic and a healing composition, comprising the following steps:

forming an first protective layer on the surface of said composite material product, said first protective layer comprising a vitreous coating including silica with an intermediate coating interposed between the vitreous coating and the surface of said composite material product, said intermediate coating being made of alumina or of a precursor of alumina;

forming a coating on said composite material product, said coating comprising a mixture of a non-oxide refractory ceramic consisting of particles smaller than fifty microns, at least one refractory oxide consisting of particles smaller than fifty microns and providing healing properties by forming a glass, and a binder comprising a polymer that is a precursor to a non-oxide refractory ceramic;

cross-linking said polymer that is a precursor to a non-oxide ceramic; and transforming said polymer into ceramic so as to obtain a second protective layer comprising a non-oxide refractory ceramic phase and a healing phase together having a structure comprising two completely commingled networks.

15. A method of protecting a composite material product against oxidation by means of at least one refractory ceramic and a healing composition, wherein the method comprises the following steps:

forming an first protective layer on the surface of said composite material product, said first protective layer comprising a vitreous coating including silica with an intermediate coating interposed between the vitreous coating and the surface of said composite material product, said intermediate coating being made of alumina or of a precursor of alumina;

forming a coating on said composite material product, said coating comprising a mixture of a non-oxide refractory ceramic consisting of particles smaller than fifty microns, at least one refractory oxide consisting of particles smaller than fifty microns and providing healing properties by forming a glass, and a binder comprising a polymer that is a precursor to a non-oxide refractory ceramic;

cross-linking said polymer that is a precursor to a non-oxide ceramic;

transforming said polymer into ceramic so as to obtain a second protective layer comprising a non-oxide refractory ceramic phase and a healing phase together having a structure comprising two completely commingled networks; and forming a third protective layer, on said second protective layer, of a composition comprising a mixture of alumina and silica phosphates.

* * * * *

UNITED STATES PATENT AND TRADEMARK OFFICE
CERTIFICATE OF CORRECTION

PATENT NO. : 5,622,751

DATED : April 22, 1997

INVENTOR(S) : Jacques Thebault, Marc Lacoste, Alain Nale

It is certified that errors appear in the above-identified patent and that said Letters Patent is hereby corrected as shown below:

In the Abstract, line 10, "lattices." should read --lattices or networks.--.

Column 5, line 12, "gain" should read --grain--.

Signed and Sealed this

Twenty-ninth Day of December, 1998

Attest:

BRUCE LEHMAN

Attesting Officer     Commissioner of Patents and Trademarks